United States Patent Office 3,188,302
Patented June 8, 1965

3,188,302
DIAMINE CURED FLUID POLYETHER
URETHANE COMPOSITIONS
John C. Lorenz, White Clay Creek Hundred, Del., assignor to E. I. du Pont de Nemours and Company, Wilmington, Del., a corporation of Delaware
No Drawing. Filed Jan. 30, 1959, Ser. No. 790,053
10 Claims. (Cl. 260—77.5)

This invention relates to novel polyurethane products and more particularly to hard, impact-resistant polyurethane products.

Even though the preparation of elastomeric polyurethanes is well-known in the art, no satisfactory hard impact-resistant polyurethane products have been available. Curable fluid polyurethane compositions containing esentially no free monomeric diisocyanate have been used to prepare molded articles; however, in general, these molded articles are much too soft for many uses. It is known that harder polyurethane products can be made from these curable fluid polyurethane compositions provided these compositions contain free monomeric diisocyanate. In general, however, such compositions present serious disadvantages in that there are health hazards associated with handling of compositions containing volatile, toxic, free diisocyanate and in addition the presence of any free diisocyanate, which is known to be highly reactive, presents processing difficulties caused by shorter pot life.

It is an object of the present invention to provide novel polyurethane products. A further object is to provide hard, impact-resistant polyurethane products which are characterized by good heat and abrasion resistance. It is a still further object to provide a process for preparing such hard, impact-resistant polyurethane products. Another object is to provide a fluid polyisocyanate composition containing essentially no free monomeric diisocyanate, which composition may be cured to form a hard, impact-resistant polyurethane product.

These and other objects of this invention are accomplished by the polyurethane products which are prepared by a process comprising (a) preparing a fluid polyisocyanate composition by reacting, at a temperature between about 25 and 100° C., an organic diisocyanate with about one mol of a polyether glycol having a molecular weight between about 1,000 and 2,500 and from about 0.5 to 3.0 mols of a glycol having a molecular weight below about 350, there being a ratio of the number of isocyanate groups to the sum of the number of hydroxyl groups ranging from about 1.5:1 to 2.0:1, and (b) reacting, at a temperature between about 25° C. to 135° C., said fluid isocyanate composition with an arylene primary diamine having a pKb of at least about 9.7 or an organic compound having a plurality of alcoholic hydroxyl groups and having a molecular weight not greater than about 350, with the proviso that the amount of arylene primary diamine be sufficient to react with from 50–100% of the free isocyanate groups in said fluid polyisocyanate composition and the amount of organic compound having a plurality of alcoholic hydroxyl groups being sufficient to provide about one hydroxyl group for each free isocyanate group in said fluid polyisocyanate composition.

The novel polyurethane products of this invention are prepared by forming a fluid polyisocyanate composition from an organic diisocyanate, a high molecular weight polyether glycol and a low molecular weight glycol, followed by the step of reacting this fluid composition with either an arylene primary diamine (having a pKb of at least about 9.7) or an organic compound containing a plurality of alcoholic hydroxyl groups. The fluid polyisocyanate composition is safe to handle and convenient to process in that it contains relatively little unreacted organic diisocyanate. The resulting polyurethane products, when prepared from the reactants described above and in the critical proportions defined above, display outstanding properties such as hardness and impact-resistance. It has been determined that polyurethane products of inferior properties will be obtained when the critical proportions defined above are not observed. Thus, when a polyether glycol having a molecular weight greater than about 2,500 is used or when less than about 0.5 mol of the low molecular weight glycol is used per mol of polyether glycol, or when fewer than 1.5 free isocyanate groups are supplied for each free hydroxyl group, or when arylene secondary diamines are substituted for the arylene primary diamines, the resulting products are not as hard as desired. On the other hand, it has been determined that brittle products displaying unsatisfactory impact-resistance will be obtained when the molecular weight of the polyether glycol is less than about 1,000 or when the arylene primary diamine is employed in an amount insufficient to react with at least 50% of the free isocyanate groups in the fluid polyisocyanate composition. When more than about 3 mols of the low molecular weight glycol is used for every mol of polyether glycol, a heterogeneous polyisocyanate composition is obtained which not only presents processing difficulties since it is often a solid at room temperatures, but also leads to inferior products when reacted with the arylene primary diamine or the organic compound containing a plurality of alcoholic hydroxyl groups. When more than about 2 free isocyanate groups are supplied for each hydroxyl group present on the high molecular weight polyether glycol and the low molecular weight glycol, excessive unreacted diisocyanate will be present in the fluid polyisocyanate composition thereby creating health hazards and shortening the available processing time.

The fluid polyisocyanate compositions are prepared by reacting a molar excess of an organic diisocyanate with a high molecular weight polyether glycol and a low molecular weight glycol under substantially anhydrous conditions. In general, the glycols may be employed as a mixture although it is to be understood that some or all of them may be separately reacted and the products obtained blended to give the desired fluid composition. Agitation is normally used to provide thorough mixing of the reactants and to aid in the temperature control. The reaction is carried out at a temperature between about 25 and 100° C. for a period of from ½ to several hours. In general, it is preferred to carry out the reaction at 80° C. for a period of about 4 hours. It is to be understood that the lower temperatures require longer reaction times and at temperatures higher than about 100° C. a composition of increased viscosity is obtained. If desired, the reaction may be carried out in more than one step. Thus, a hydroxyl-terminated polyurethane may be made by reacting the organic diisocyanate with a molar excess of one or both of the glycols. This polyurethane in turn may then be reacted with additional organic diisocyanate or isocyanate-terminated polyurethane. In any event, the proportions of reactants used should be selected so that from about 0.5 to 3.0 mols of the low molecular weight glycol is used for every mol of polyether glycol and the ratio of the number of free isocyanate groups to the total number of hydroxyl groups should be from about 1.5:1 to 2.0:1. In the absence of moisture, the fluid polyisocyanate composition is indefinitely stable at room temperature. The term "fluid" as used throughout the specification and claims to define these compositions, means that they may be viscous at room temperature but are capable of being poured, even when fully compounded, at 100° C.

As mentioned above, the fluid polyisocyanate composition is prepared from a polyether glycol having a molecular weight of between about 1,000 and 2,500, a low molecular weight glycol having a molecular weight not greater than about 350 and an organic diisocyanate. The useful polyether glycols are polyalkyleneether glycols, polyalkylene-aryleneether glycols, polyalkyleneether-thioether glycols, and polyalkylene-aryleneether-thioether glycols. Polyalkyleneether glycols are preferred. Mixtures of the high molecular weight glycols may be used when desired. The polyalkyleneether glycols may be represented by the formula $HO(RO)_nH$ wherein R is an alkylene radical which need not necessarily be the same in each instance and $n$ is an integer. Representative glycols include polyethyleneether glycol, polypropyleneether glycol, polytrimethyleneether glycol, polytetramethyleneether glycol, polypentamethyleneether glycol, polydecamethyleneether glycol, polytetramethyleneformal glycol and poly-1,2-dimethylethyleneether glycol. Mixtures of two or more polyalkyleneether glycols may be employed if desired.

The polyalkyleneether-thioether glycols may be represented by the formula $HO(QY)_aH$ wherein Q represents hydrocarbon radicals at least some of which are alkylene, Y represents chalcogen atoms some of which are sulfur and the rest oxygen, and $a$ is an integer sufficiently large so that the molecular weight of the polymer is about 1,000 to 2,500. The following are representative examples:

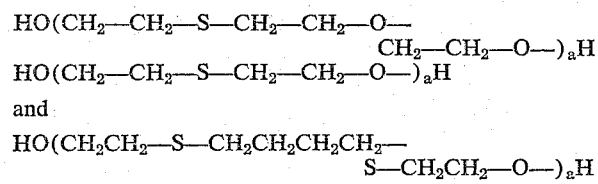

These glycols may be prepared by condensing together various glycols and thiodiglycols in the presence of a catalyst such as p-toluene sulfonic acid.

The polyalkylene-arylene glycols are similar to the polyalkyleneether glycols except that some arylene radicals are present. The phenylene, naphthalene and anthracene radicals may be used with or without substituents such as alkyl or alkylene groups, and, in general there should be at least one alkyleneether radical having a molecular weight of about 500 for each arylene radical which is present. When part of the ether oxygens are replaced with sulfur, a polyalkylene-aryleneether-thioether glycol results, which also may be used in the subject composition.

The low molecular weight glycols, which have a molecular weight not greater than about 350, are employed in an amount sufficient to provide from about 0.5–3.0 mols of such a glycol per mol of polyalkyleneether glycol. Representative glycols include ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1, 4 - diol, 3 - cyclohexene - 1,1 - dimethanol, 4 - methyl - 3 - cyclohexene - 1,1 - dimethanol, 3 - methylene - 1,5-pentanediol, diethylene glycol, (2 - hydroxyethoxy)-1-propanol, 4-(2-hydroxyethoxy)-1-butanol, 5-(2-hydroxypropoxy)-1-pentanol, 1 - (2-hydroxymethoxy)-2-hexanol, 1-(2-hydroxypropoxy)-2-octanol, 3-allyloxy-1,5-pentanediol, 2-allyloxymethyl-2-methyl - 1,3 - propanediol, [(4-pentenyloxy)methyl] - 1,3 - propanediol, 3-(o-propenylphenoxy) - 1,2 - propanediol, thiodiglycol, 2,2'-[thiobis (ethyleneoxy)]diethanol, polyethyleneether glycol (molecular weight 200) and 2,2'-isopropylidenebis(p-phenyleneoxy)diethanol. If desired, mixtures of two or more of these low molecular weight glycols may be used.

In preparing the fluid polyisocyanate compositions any of a wide variety of organic diisocyanates may be employed either alone or as isomer mixtures or as mixtures of different diisocyanates. Aromatic, aliphatic and cycloaliphatic diisocyanates and combinations of these types are useful. Arylene diisocyanates, i.e. those in which each of the two isocyanate groups is attached directly to an aromatic ring, are preferred. Arylene diisocyanates in which the two isocyanate groups differ in reactivity are particularly desirable. Examples of useful diisocyanates include toluene-2,4-diisocyanate, 4-methoxy-1,3-phenylenediisocyanate, 4 - isopropyl - 1,3 - phenylenediisocyanate, 4-chloro-1,3-phenylenediisocyanate, 4-butoxy-1,3-phenylenediisocyanate, 2,4 - diisocyanatodiphenylether, mesitylene diisocyanate, durylene diisocyanate, 4,4'-methylene - bis(phenylisocyanate), 1,5 - naphthalene diisocyanate, benzidine diisocyanate, o-nitrobenzidine diisocyanate, 4,4'-diisocyanatodibenzyl, 1,4-tetramethylene diisocyanate, 1,6-hexamethylene diisocyanate, 1,10-decamethylene diisocyanate, 1,4-cyclohexylene diisocyanate, xylylene diisocyanate, 4,4'-methylene-bis(cyclohexyl isocyanate) and 1,5-tetrahydronaphthalene diisocyanate. A representative isomer mixture contains 80% toluene-2,4-diisocyanate and 20% toluene-2,6-diisocyanate.

The resulting fluid polyisocyanate composition may then be reacted with either an arylene primary diamine (exhibiting a pKb of at least about 9.7) or an organic compound containing a plurality of hydroxyl groups so as to prepare a hard, impact-resistant polyurethane product. The amount of arylene primary diamine employed should be sufficient to react with from about 50–100% of the free isocyanate groups in the fluid polyisocyanate composition. It is to be understood that the term "arylene diamines" means those compounds in which each of the two primary amino groups is attached directly to an aromatic ring. The useful arylene primary diamines should exhibit a pKb at 25° C. of at least about 9.70. Primary diamines more basic than p-toluidine (pKb of about 8.7), that is, displaying pKb values less than about 9.70, react so rapidly with the isocyanate composition that satisfactory mixing becomes very difficult and heterogeneous products may result. It is particularly convenient to use arylene primary diamines exhibiting a pKb at 25° C. of at least about 11.7. Representative examples of these preferred amines are 4,4' - methylene - bis(2 - chloroaniline), 4,4' - methylene-bis(2 - carbomethoxyaniline), 4,4' - diaminodiphenyldisulfide, and 4,4'-diaminodiphenylsulfone. Other useful arylene primary diamines are: 4,4'-methylene-bis(2-methylaniline), 4,4' - methylene - bis(2 - methoxyaniline), 4,4' - methylene - bis(3 - bromoaniline) and 4,4'-methylenedianiline. Mixtures of diamines may be used. The reaction of the fluid polyisocyanate composition with the diamine should be carried out at a temperature of from about 25° C. to 135° C. for a period of time from about one to 24 hours. In general, a reaction temperature of 100° C. for about 3 hours is preferred. Less time is required at temperatures above about 100° C. whereas the lower temperatures require a longer time and at temperatures below about 100° C. the product output is decreased.

Organic compounds containing a plurality of alcoholic hydroxyl compositions may be substituted for part or all of the arylene primary diamine for reaction with the fluid polyisocyanate compositions. The amount of such an organic compound employed should be sufficient to provide about 1 alcoholic hydroxyl group for each free isocyanate group in the fluid polyisocyanate composition. In other words, a stoichiometric equivalent amount should be used. These organic compounds containing a plurality of alcoholic hydroxyl groups should have a molecular weight not greater than about 350. Representative compounds include the low molecular weight glycols recited above, glycerol, 1,2,6-hexanetriol, 1,1,1-trimethylolpropane, 1,1,1-trimethylolethane, 3 - (2 - hydroxyethoxy) - 1, 2 - propanediol, 3 - (2-hydroxypropoxy) - 1,2 - propanediol, 2,4 - dimethyl - 2- (2 - hydroxyethoxy)methylpentanediol - 1,5, 1,1,1 - tris [(2 - hydroxyethoxy)methyl]ethane, 1,1,1 - tris[(2 - hydroxypropoxy)methyl]propane, triethanolamine, triisopropanolamine and N,N,N',N'-tetrakis(2-hydroxyethyl) ethylenediamine. Mixtures of two or more of the above hydroxy compounds may be used if desired.

The cured products prepared herein have many varied applications. They are particularly useful for machine parts, potting and incapsulation of electronic equipment, and as a metal replacement. Among the many articles and uses to which these cured products are applicable may be mentioned the following: solid tires; mechanical goods, molded, lathe cut, stamped out, cast or dipped, such as grommets, sealing rings, channel rubbers, packing gaskets, mountings, matting (floor covering), tile, rolls, oil-well swabs, pipe-wipers, slush pump pistons, packers, tractor cleats, tank tread blocks, etc.; footwear, heels; coated fabrics of cotton, glass fibers, rayon, wool, polyacrylonitrile, polyester fibers, leather, paper, plastics; films in the form of sheeting, wrapping film, etc.; coating compositions for wood, metal, plastic, concrete, brick, ceramics, leather, etc.; cellular products which may be self-blown or expanded with a blowing agent for use as vibration dampers, shock absorbers, packaging material or buoyant articles.

The following examples will better illustrate the nature of the present invention; however, the invention is not intended to be limited to these examples. Parts are by weight unless otherwise indicated.

In the examples the following ASTM procedures are used:

Shore A hardness _____ D676–49T
Shore D hardness _____ D676–49T
Izod impact resistance _____ D256–56
Yerzley resilience _____ D945–55
Young's modulus _____ D797–46

The tensile strength, extension at break and modulus at various extensions are measured with an Instron testing machine. The polyurethane product sample is shaped as a standard Scott dumbbell (see ASTM Procedure D412–51T). It is placed in a self-closing clamp having a eccentric roller jaw and a knurled surface; the roller is 1⅜ inches long and 1⅜ inches in diameter. The sample is drawn at a head speed of 1 inch per minute.

EXAMPLE 1

A mixture of 1511 parts of a polytetramethylene-ether glycol (M.W. 1000) and 136 parts of 1,4-butane diol was dried to a water content of <0.04% by heating under reduced pressure. After cooling, 1052 parts of toluene-2,4-diisocyanate was added and the mixture was stirred and heated at 80° C. for four hours. The resulting viscous liquid composition had an isocyanate group content of 9.2% and it could be stored indefinitely in the absence of moisture. Portions 1A to 1D of this compoistion were converted to hard elasto-plastic polymers, 1A–1D, respectively, by mixing these portions at 100° C. with the amounts of 4,4'-methylene-bis-(2-chloroaniline) shown in Table I below, casting the masses quickly into molds and then heating for 3 hours at 100° C. Table I gives some properties of the products obtained.

*Table I*

| Polymer | Curing system | | Polymer properties | | | | | |
|---|---|---|---|---|---|---|---|---|
| | Parts of amine a | Stoich. percent amine supplied | $T_B$ (p.s.i.) | $M_{100}$ (p.s.i.) | $E_B$ (percent) | Shore D hardness | Izod impact (ft. lbs./in.) | Young's modulus (p.s.i.) |
| 1-A | 30 | 100 | 8,550 | 2,675 | 300 | 75 | 5 | 66,800 |
| 1-B | 25 | 85 | 8,900 | 3,250 | 250 | 73 | 9 | 80,000 |
| 1-C | 20 | 69 | 7,800 | 3,725 | 215 | 69 | >20 | 63,000 |
| 1-D | 15 | 50 | 6,675 | 3,325 | 185 | 69 | (b) | 37,500 | a Per 100 parts of fluid polyisocyanate composition.
b Flexed under hammer, no break.

EXAMPLE 2

Liquid polyisocyanate compositions (2A–2C) were prepared from a polytetramethyleneether glycol (PTMEG) (M.W. 1000), 1,4-butane diol and toluene-2,4-diisocyanate (2,4-TDI) according to the procedure given in Example 1 except that the amounts of materials given in Table II were used. These compositions were cured for 3 hours at 100° C. to hard elasto-plastics (Polymers 2A–2C) with 4,4'-methylene-bis(2-chloroaniline) in an amount sufficient to react with 90% of all the unreacted isocyanate groups in the fluid composition.

*Table II*

| Polymer | Reactants | | | | | Polymer properties | | | |
|---|---|---|---|---|---|---|---|---|---|
| | Parts PTMEG | Parts 1,4-butanediol | Parts 2,4-TDI | Comp. NCO content (percent) | Parts of amine a | $T_B$ | $E_B$ | $M_{50}$ | Shore D hardness |
| 2-A | 150 | 14.7 | 100 | 7.65 | 22.4 | 9,560 | 270 | 2,820 | 69 |
| 2-B | 150 | 14.7 | 85.7 | 5.86 | 16.8 | 8,760 | 290 | 1,820 | 60 |
| 2-C | 150 | 7.4 | 77.1 | 8.64 | 24.7 | 7,880 | 250 | 2,830 | 65 | a Per 100 parts of polyisocyanate composition.

EXAMPLE 3

Fluid polyisocyanate compositions 3A–3F were prepared according to the procedure of Example 1 from equimolar mixtures of a polytetramethyleneether glycol (PTMEG) (M.W. 1000) and a low molecular weight glycol shown in Table III below (used in place of the 1,4-butane diol of Example 1) with toluene-2,4-diisocyanate at an isocyanate to total hydroxyl ratio of 2:1. These compositions (3A–3F) were cured to elasto-plastic polymers 3A–3F, respectively, with 4,4'-methylene-bis-(2-chloroaniline) at 100° C. for 3 hours in an amount sufficient to react with 90% of the isocyanate groups of the fluid composition.

*Table III*

| Polymer | Reactants | | | Polymer properties | | | |
|---|---|---|---|---|---|---|---|
| | Types of low M.W. glycol | Comp. NCO content (percent) | Parts of Amine a | $T_B$ | $E_B$ | $N_{50}$ | Shore D hardness |
| 3-A | Ethylene glycol | 8.5 | 24.4 | 7,880 | 205 | 3,490 | 70 |
| 3-B | 1,3-butanediol | 9.5 | 27.2 | 7,820 | 240 | 2,930 | 70 |
| 3-C | 1,5-pentaneglycol | 9.2 | 26.3 | 5,440 | 160 | 4,080 | 78 |
| 3-D | 1,6-hexanediol | 9.5 | 27.0 | 5,000 | 110 | 4,180 | 70 |
| 3-E | 1,10-decanediol | 8.8 | 25.2 | 7,630 | 190 | 3,620 | 72 |
| 3-F | 2,5-di(hydroxymethyl)-tetrahydrofuran. | 8.7 | 24.8 | 3,930 | 110 | 3,450 | 70 | a Per 100 parts of polyisocyanate composition.

It is to be understood that similar results are obtained in any of the preceding examples when part or all of the 4,4'-methylene-bis(2-chloroaniline) is replaced by an equivalent amount of 4,4'-methylene-bis(2-carbomethoxyaniline) or 4,4'-diaminodiphenyl sulfone or mixtures thereof.

EXAMPLE 4

To 100 parts of the fluid polyisocyanate composition, having a free isocyanate content of 9.2%, as prepared in Example 1, at 100° C. was added with stirring 7.5 parts of 1,4-butane diol, 2 parts of trimethylolpropane, and 0.5 part of phenothiazine. The mixture obtained was poured into a mold which was subsequently heated for 4 hours at 140° C. and 16 hours at 100° C. The polymer obtained displayed the following properties: $M_{100}$, 350 (p.s.i.); $M_{300}$, 800 (p.s.i.); $T_B$, >6,000 (p.s.i.); $E_B$, 500 (percent); Shore A hardness, 75; Yerzley resilience, 12 (percent).

EXAMPLE 5

A. A fluid polyisocyanate composition is made by substituting 1,3-butane diol for the 1,4-butane diol used in the procedure of Example 1.

B. To 100 parts of the above fluid polyisocyanate composition at 100° C. was added with agitation 9 parts of 1,4-butane diol, 1 part of trimethylolpropane and 0.5 part of phenothiazine. The resulting mixture was introduced into a mold which was subsequently heated for 6 hours at 140° C.; Polymer 5B, thereby obtained, was allowed to stand for one week at room temperature before being tested. It then displayed the following properties: $M_{100}$, 550 (p.s.i.); $T_B$, 5,800 (p.s.i.); $E_B$ 400 (percent); Shore A hardness, 89.

As many widely different embodiments of this invention may be made without departing from the spirit and scope thereof, it is to be understood that this invention is not limited to the specific embodiments thereof except as defined in the appended claims.

What is claimed is:

1. A polyurethane product prepared by a process comprising (a) preparing a fluid isocyanato-terminated composition by reacting at a temperature between about 25° C. and 100° C., (1) an organic diisocyanate selected from the group consisting of toluene-2,4-diisocyanate and a mixture of toluene-2,4-diisocyanate and toluene-2,6-diisocyanate, with (2) about one mol of a polyalkyleneether glycol having a molecular weight between about 1,000 and 2,500 and (3) from about 0.5 to 3.0 mols of a glycol having a molecular weight below about 350; the ratio of the number of isocyanate groups provided by said organic diisocyanate to the sum of the number of hydroxyl groups provided by said polyalkyleneether glycol and said glycol having a molecular weight below about 350 having a value ranging from about 1.5:1 to 2.0:1, and (b) reacting, at a temperature between about 25° C. to 135° C., said fluid isocyanato-terminated composition with an arylene primary diamine having a pKb at 25° C. of at least 9.7; with the proviso that the amount of arylene primary diamine be sufficient to react with from 50–100% of the free isocyanato groups in said fluid isocyanato-terminated composition.

2. The polyurethane product of claim 1 wherein the polyalkyleneether glycol is selected from the group consisting of polypropyleneether glycol and polytetramethyleneether glycol.

3. The polyurethane product of claim 2 wherein the organic diisocyanate is toluene-2,4-diisocyanate.

4. The polyurethane product of claim 3 wherein the glycol having a molecular weight below about 350 is selected from the group consisting of 1,3-butanediol and 1,4-butanediol.

5. The polyurethane product of claim 4 wherein the arylene primary diamine is 4,4'-methylene-bis(2-chloroaniline).

6. The polyurethane product of claim 1 wherein the arylene primary diamine has a pKb at 25° C. of at least 11.7.

7. A fluid isocyanato-terminated composition obtained by reacting at a temperature between about 25° C. and 100° C., (1) an organic diisocyanate selected from the group consisting of toluene-2,4-diisocyanate and a mixture of toluene-2,4-diisocyanate and toluene-2,6-diisocyanate, with (2) about one mol of a polyalkyleneether glycol having a molecular weight between about 1,000 and 2,500 and (3) from about 0.5 to 3.0 mols of a glycol having a molecular weight below about 350; the ratio of the number of isocyanate groups provided by said organic diisocyanate to the sum of the number of hydroxyl groups provided by said polyalkyleneether glycol and said glycol having a molecular weight below about 350 having a value ranging from about 1.5:1 to 2.0:1.

8. The fluid isocyanato-terminated composition of claim 7 wherein the polyalkyleneether glycol is selected from the group consisting of polypropyleneether glycol and polytetramethyleneether glycol.

9. The fluid isocyanto-terminated composition of claim 8 where the organic diisocyanate is toluene-2,4-diisocyanate.

10. The fluid isocyanato-terminated composition of claim 9 where the glycol having a molecular weight below about 350 is selected from the group consisting of 1,3-butanediol and 1,4-butanediol.

References Cited by the Examiner

UNITED STATES PATENTS

| | | | |
|---|---|---|---|
| 2,808,391 | 10/57 | Pattison | 260—77.5 |
| 2,899,411 | 8/59 | Schollenberger | 260—77.5 |
| 2,901,467 | 8/59 | Croco | 260—32.4 |
| 2,917,489 | 12/59 | Gladding | 260—77.5 |
| 2,929,794 | 3/60 | Simon et al. | 260—77.5 |
| 3,012,987 | 12/61 | Ansul | 260—77.5 |

LEON J. BERCOVITZ, *Primary Examiner.*

H. N. BURSTEIN, MILTON STERMAN, *Examiners.*